(12) United States Patent
Postelnicu et al.

(10) Patent No.: US 8,953,836 B1
(45) Date of Patent: Feb. 10, 2015

(54) REAL-TIME DUPLICATE DETECTION FOR UPLOADED VIDEOS

(75) Inventors: Gheorghe Postelnicu, Zurich (CH); Richard Iles Tucker, New York, NY (US); Murali Krishna Viswanathan, Paris (FR); Nicola Muscettola, Sunnyvale, CA (US); Varun Kacholia, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 414 days.

(21) Appl. No.: 13/363,116

(22) Filed: Jan. 31, 2012

(51) Int. Cl.
*G06K 9/00* (2006.01)

(52) U.S. Cl.
USPC ....................................... 382/100

(58) Field of Classification Search
None
See application file for complete search history.

(56) References Cited

U.S. PATENT DOCUMENTS

| | | | |
|---|---|---|---|
| 6,184,792 B1 * | 2/2001 | Privalov et al. ............... | 340/578 |
| 7,046,909 B2 | 5/2006 | Manbeck | |
| 7,539,675 B2 | 5/2009 | Risberg et al. | |
| 8,094,872 B1 * | 1/2012 | Yagnik et al. ................. | 382/100 |
| 8,374,387 B2 * | 2/2013 | Lienhart et al. .............. | 382/100 |
| 8,452,106 B2 * | 5/2013 | Ke et al. ........................ | 382/195 |
| 8,625,033 B1 * | 1/2014 | Marwood et al. ............. | 348/701 |
| 2007/0047816 A1 * | 3/2007 | Graham et al. ................ | 382/181 |
| 2008/0101762 A1 * | 5/2008 | Kellock et al. ................ | 386/52 |
| 2008/0178302 A1 * | 7/2008 | Brock et al. ................... | 726/32 |
| 2008/0288509 A1 | 11/2008 | Mysen et al. | |
| 2009/0028517 A1 | 1/2009 | Shen et al. | |
| 2009/0070346 A1 * | 3/2009 | Savona et al. ................. | 707/100 |
| 2009/0296823 A1 * | 12/2009 | Doumenis et al. ....... | 375/240.24 |
| 2009/0328237 A1 * | 12/2009 | Rodriguez et al. ............. | 726/32 |
| 2010/0104261 A1 * | 4/2010 | Liu et al. ......................... | 386/95 |
| 2010/0169358 A1 * | 7/2010 | Zhang ............................ | 707/769 |
| 2010/0182401 A1 * | 7/2010 | Yoon et al. ..................... | 348/42 |
| 2010/0265390 A1 * | 10/2010 | Zhang ........................... | 348/441 |
| 2011/0019871 A1 * | 1/2011 | Loos et al. ..................... | 382/100 |
| 2011/0085728 A1 * | 4/2011 | Gao et al. ...................... | 382/165 |
| 2011/0122255 A1 | 5/2011 | Haritaoglu | |
| 2011/0208744 A1 | 8/2011 | Chandiramani et al. | |

OTHER PUBLICATIONS

Jun Jie Foo, et al. Clustering Near Duplicate images in Large collections, 2007, MIR'07, Augsburg, Bavaria Germany.*
Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.

(Continued)

*Primary Examiner* — Chan Park
*Assistant Examiner* — Iman K Kholdebarin
(74) *Attorney, Agent, or Firm* — Amin, Turocy & Watson, LLP

(57) ABSTRACT

Systems and methods are provided herein relating to real-time duplicate detection of video content. Fingerprints can be generated for an uploaded video. The fingerprints can be used to match the uploaded video to a set of matching videos. The set of matching videos can be filtered based on the type of match, and the quality of the match. A unique cluster-id can be generated for the uploaded video containing an upload time, and that unique cluster-id can then be modified to associate the uploaded video with a cluster-id of potential duplicates. Cluster-ids can then be used in the context of a search to filter results that have identical cluster-ids. The benefits in using real-time duplicate detection can better maximize user experiences in a video sharing service that contains potential duplicates of the same content.

23 Claims, 10 Drawing Sheets

(56) References Cited

OTHER PUBLICATIONS

Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.

Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

* cited by examiner

REAL-TIME DUPLICATE DETECTION FOR UPLOADED VIDEOS

TECHNICAL FIELD

This application relates to video classification, and more particularly to real-time detection of duplicates of an uploaded video.

BACKGROUND

Video sharing services have become prolific on the internet as connection speeds have increased giving consumers the ability to upload their own personal videos. Most video sharing services act strictly as an intermediary, for example, they give the user a forum to display the user's version of a video. The video sharing service can then host the user uploaded video allowing other users on the internet the ability to watch the uploaded video.

Some videos on video sharing services have greater popularity than others. Some of the popular videos can go "viral" and attract millions of people to watch the content. A viral video can generate notoriety, generate website traffic and in some instances generate revenue to the user who uploaded the video. Because of these and other benefits, often times viral videos are duplicated and uploaded multiple times by other users.

When users of a video sharing service search for videos that have gone viral, often times the search results contain many duplicates of the same content. This can result in a poor experience for a user searching for a viral video.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to media classification. An input component can receive an uploaded video. A fingerprint component can generate a fingerprint for the uploaded video. A matching component can compare the fingerprint to a set of reference fingerprints to determine a set of matching videos. A filter component can filter the set of matching videos to generate a filtered set of matching videos. A cluster component can generate a unique cluster-id for the uploaded video wherein the unique cluster-id includes an upload time. A cluster modification component can modify the unique cluster-id based on a set of cluster-ids associated with the filtered set of matching videos.

This disclosure also provide for a system that includes means for receiving an uploaded media; means for generating a fingerprint for the uploaded media; means for comparing the fingerprint to a set of reference fingerprints to determine a set of matching media; means for generating a filtered set of matching media based upon the set of matching media; means for generating a unique cluster-id for the uploaded media wherein the unique cluster-id is based at least in part on an upload time; and means for modifying the unique cluster-id based on a set of cluster-ids associated with the filtered set of matching media.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
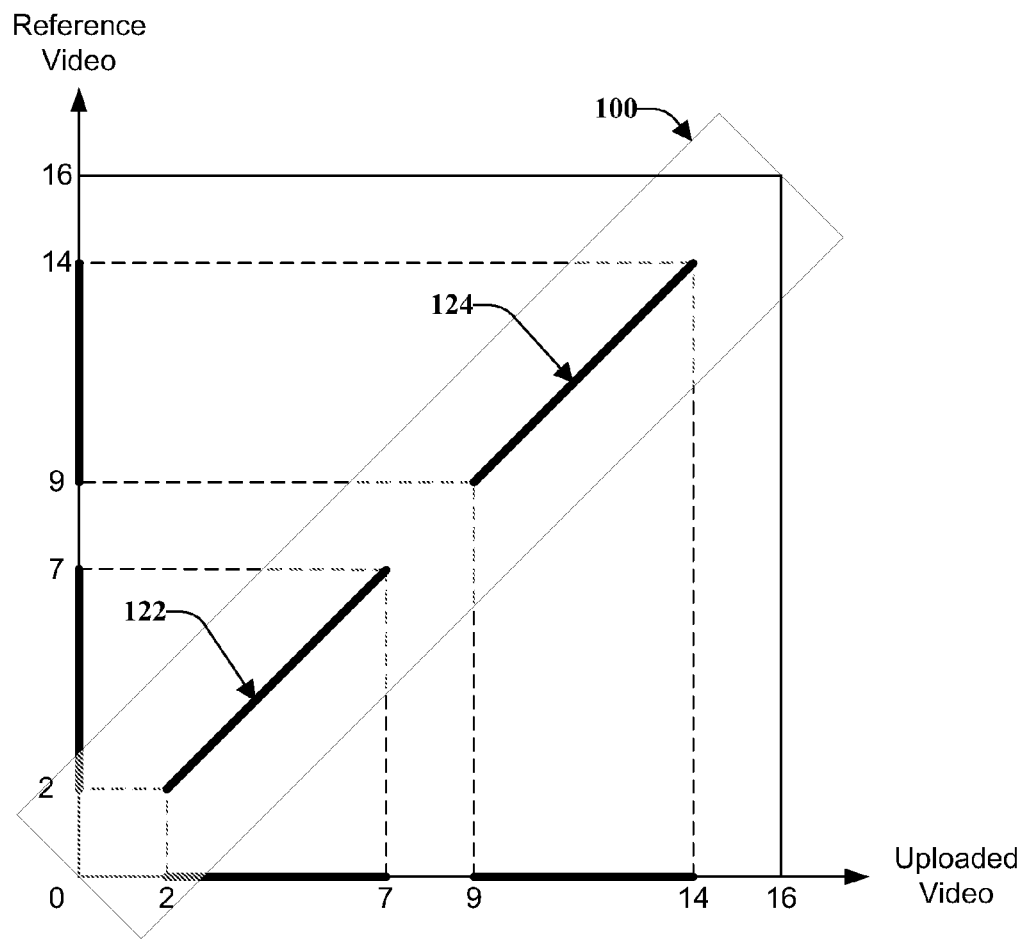
FIG. 1 illustrates an example filter in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

When a user of a video sharing service searches for popular videos, often times the search results contain duplicates of the same visual or audio content, e.g., uploaded by different users. This can result in a poor experience for a user searching for a video that has "gone viral".

Systems and methods herein provide for identifying potential duplicates of an uploaded media (e.g., video) in real time (e.g., at the time of upload). The uploaded media can be compared to previously uploaded media to determine if the uploaded media is a duplicate of an existing media. If the media is a duplicate, a unique cluster-id associated with the uploaded media can be modified to associate the uploaded media with a cluster of duplicates, e.g., those videos that are an audio duplicate, a video duplicate, or an audio-video duplicate of an uploaded video. Cluster identifiers can then later be used in the context of a search to filter the results returned to a user searching for a media with known duplicates.

A first step in identifying duplicates can be identifying a set of potential matches to the uploaded media, e.g., an uploaded video. Both video and audio fingerprinting can be used in identifying potential matches. For example, in video fingerprinting, unique features of the video, also known as interest points, can be extracted and stored as a video fingerprint where the video fingerprint is a function of a set of interest points. Interest points can be based on extracted features such as a histogram of local features, a color histogram, edge features, a histogram of textons, face features, camera motion, shot boundary features, audio features, etc. Video fingerprints are generally much smaller than the actual video files themselves. Thus, comparing the video fingerprint of an uploaded video to a plurality of reference video fingerprints stored within a data store can be accomplished quickly and on a large scale.

Similar to video fingerprinting, in audio fingerprinting, unique features of an audio track, also known as interest points, can be extracted and stored as an audio fingerprint where the audio fingerprint is a function of a set of interest points. Interest points within an audio track can include unique spectral events, such as a spectral peak at a point in time or the onset of a spectral peak at a point in time. Audio fingerprints are generally much smaller than the actual audio files themselves. Thus, comparing the audio fingerprint of an uploaded video to a plurality of reference audio fingerprints associated with reference videos can be accomplished quickly and on a large scale.

Using audio and video fingerprinting together, a set of potential matching reference videos to the uploaded video can be identified based on the audio and video fingerprints of the uploaded video. However, a returned set of potential matches based on fingerprints may generate false positives, e.g., references identified as a match that don't meet more specific matching criteria. Thus, a filter can be useful to further identify and classify potential matches.

Referring to FIG. 1, there is illustrated an example filter in accordance with implementations of this disclosure. In comparing the content between an uploaded video and a reference video, portions of the uploaded video could be a duplicate of portions of a reference video, without the two videos being exact duplicates of each other. For example, an authorized user could edit a highly popular video and change portions of the video based on their own tastes. In one implementation, for two videos to be considered duplicates, the two videos must be of the same approximate length and the matching content must be within a consistent timeline and be a significant portion of the video. It can be appreciated that a threshold establishing the difference in length between an uploaded video and a reference video can be adjusted based on desired results. It can be further appreciated that a threshold that determines, for example, what percentage of the uploaded video must match the reference video to be a significant portion of the video can also be adjusted based on desired results.

An example comparison of an uploaded video and a reference video is depicted in FIG. 1. It can be appreciated that this is an example comparing visual characteristics of an uploaded video and a reference video and that audio tracks relating to the uploaded video and a reference video can be compared in a similar manner. In this example, both the reference video and the uploaded video have identical lengths of 16 seconds. The graph depicts the uploaded video timeline on the horizontal axis and the reference video timeline on the vertical axis. The bolded portions of each axis, those sections between 2 and 7 seconds and between 9 and 14 seconds, show the sections within a consistent timeline that are duplicates.

In FIG. 1, diagonal filter 100 only takes into account matches that are on a consistent timeline. For example, because the second matching portion of the video, between time 9 and 14, occurs at the same time, in each video, the duplication, denoted as 124, can be considered as within a consistent timeline, and within the boundaries of diagonal filter 100. Because matching sections 122 and 124 are within diagonal filter 100, the matching portions are deemed on a consistent timeline. It can be appreciated that the sensitivity of the diagonal filter 100 can be adjusted by lengthening or shortening the length or width of diagonal filter 100.

A coverage filter can also be applied. Using the reference video and uploaded video from FIG. 1 as an example, the first matching section occurs between a time of 2 and 7 seconds. The second matching section occurs between a time of 9 and 14 seconds. Thus, the two matching sections account for 10 seconds of the 16 second videos. A coverage filter can compute the total time of all matching sections established by diagonal filter 100. Therefore, a coverage filter that is applied to the two samples in FIG. 1 would compute that 10 seconds out of the total 16 seconds were covered by matching segments. It can be appreciated that a threshold can be established for the coverage filter that establishes a minimum amount of matching segment coverage that is to be present for the uploaded video to be determined as a duplicate. In one example, the threshold can be a percentage. For example, if the percentage threshold is 75%, the threshold would require that 75% of the duration of the uploaded video be covered by matching segments of the reference video for the uploaded video to be determined a "duplicate" of the reference video. In the example depicted in FIG. 1, only 10 out of 16 seconds of the video are matching segments equaling a percentage of 62.5%. Thus, the reference video in FIG. 1 would not be deemed a match based on a coverage filter having 75% as the percentage threshold.

The coverage filter and diagonal filter can be applied to matches of audio content, matches of video content, and matches of both audio and video of the uploaded video. Reference videos that meet the thresholds of both the coverage filter and diagonal filter for video content can be identified as a video-duplicate. Reference videos that meet the thresholds of both the coverage filter and diagonal filter for audio content can be identified as an audio-duplicate. Reference videos that meet the threshold of both the coverage filter and the diagonal filter for both video and audio can be identified as an audio-video duplicate.

Figure 2:
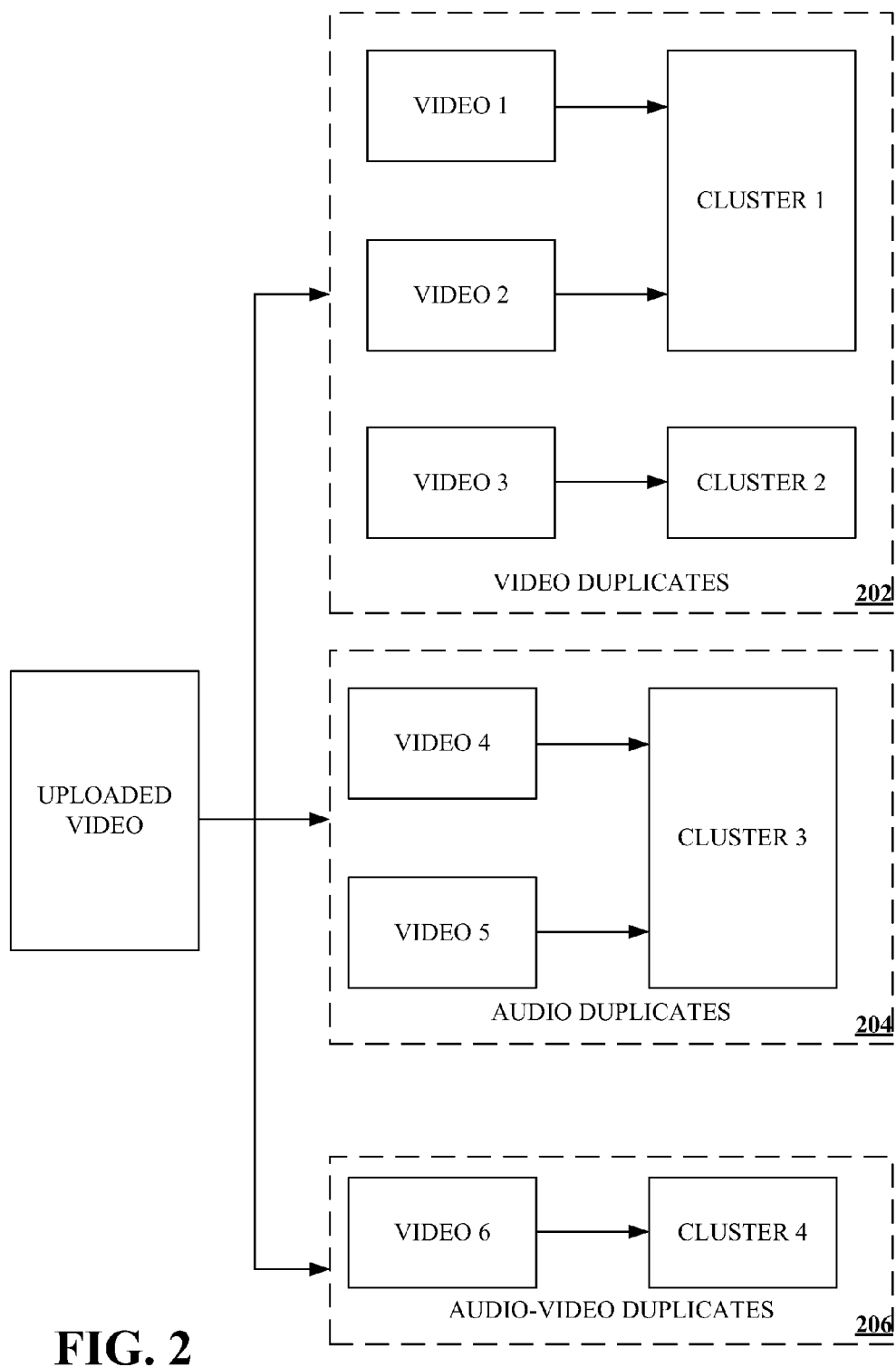
FIG. 2 illustrates an example of cluster-id association in accordance with implementations of this disclosure.

Referring now to FIG. 2, there is illustrated an example of cluster-id association in accordance with implementations of this disclosure. At the time of upload, a unique cluster-id for the uploaded video can be generated where the cluster-id contains a time stamp of the upload time. An uploaded video can be associated with a set of video duplicates 202, e.g., Video 1, Video 2, and Video 3, a set of audio duplicates 204, e.g., Video 4 and Video 5, and a set of audio-video duplicates 206, e.g., Video 6. Each of the duplicates in the sets of duplicates can be associated with a cluster-id.

A cluster-id for each type of set of duplicates can be associated with the uploaded video. For example, both Video 1 and Video 2 in the set of video duplicates 202 are associated with the same cluster-id, Cluster 1. Video 3 in the set of video duplicates 202 is associated with Cluster 2. It can be appreciated that Video 1, Video 2, and Video 3 can be duplicates of the uploaded video without being duplicates of each other. In an example where the coverage filter threshold is 75%, Video 1 and Video 2 can both meet a 95% coverage filter threshold as compared to the uploaded video where Video 3 can just meet the 75% coverage filter threshold as compared to the uploaded video. While Video 1, Video 2, and Video 3 all meet the coverage filter threshold when compared with the uploaded video, Video 3 as compared to either Video 1 or Video 2 can fail to meet the same 75% coverage filter threshold. With two clusters associated to videos in the set of video duplicates 202, it can be determined whether Cluster 1 or Cluster 2 has the earliest upload time. For example, if Cluster 1 was first uploaded at 1:00 PM and Cluster 2 was first uploaded at 1:02 PM on the same day, Cluster 1 will be deemed the earliest upload time, and the cluster-id associated with cluster 1 can be associated with the uploaded video with regards to video duplicates. This process can then repeat itself with both the set of cluster ids associated with the set of audio duplicates 204 and the set of cluster-ids associated with the set of audio video-duplicates 206. It can be appreciated that, in this example, three additional cluster-ids can be associated with the uploaded video. The original cluster-id related to the upload time of the uploaded video can be retained, in that the time of upload associated with the uploaded video is not lost when the uploaded video is associated with cluster-ids related to video duplicates, audio duplicates, and audio-video duplicates.

As described in greater detail below, cluster-ids can later be used in the context of a search to, for example, filter out results with identical cluster-ids for a given query. In another example, cluster-ids can be used to group or otherwise visually signal to a user performing a search that 2 or more videos in a set of search results have a similar audio track, similar video, or similar audio and video.

Figure 3:
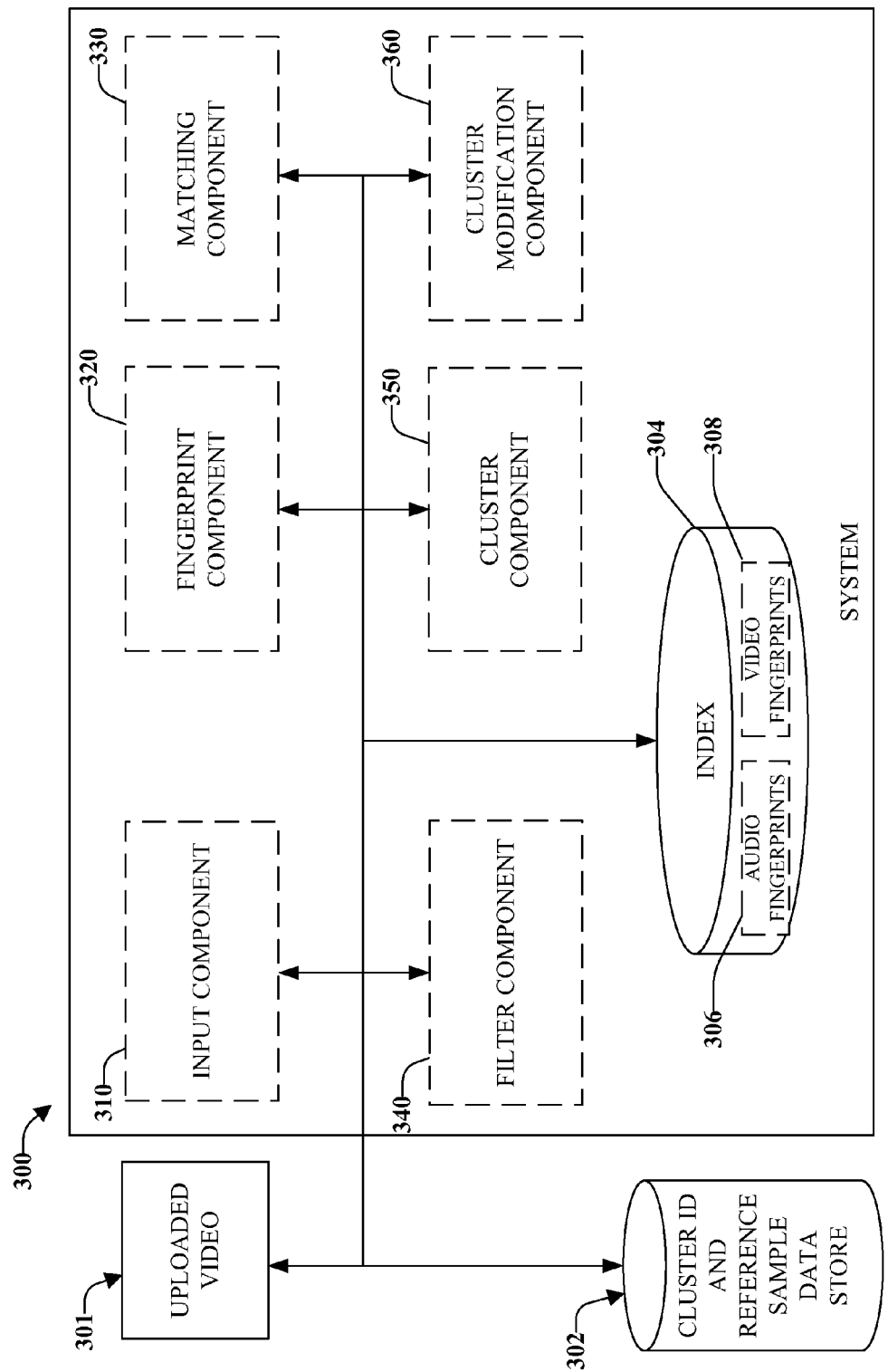
FIG. 3 illustrates a high-level functional block diagram of an example system that detects duplicates of an uploaded video in accordance with implementations of this disclosure.

Referring now to FIG. 3, there is illustrated a high-level functional block diagram of an example system that detects duplicates of an uploaded video in accordance with implementations of this disclosure. Input component 310 can receive an uploaded video 301. For example a user can upload a video using any of the widely available protocols including hyper text transfer protocol ("HTTP"), File Transfer Protocol ("FTP"), etc. and input component 310 can receive the uploaded video 301. Fingerprint component 320 can generate a fingerprint for uploaded video 301. In one implementation, this fingerprint is generated in "real time" as part of an intake processing of the uploaded video. The fingerprint can contain an audio fingerprint, a video fingerprint, or both an audio and video fingerprint.

Matching component 330 can compare the fingerprint to a set of reference fingerprints to determine a set of matching videos. For example, matching component 330 can compare an audio fingerprint portion of the fingerprint of uploaded video 301 to a set of reference audio fingerprints 306 stored within a memory, data store or index 304. Matching component 330 can also compare a video fingerprint portion of the fingerprint of uploaded video 301 to a set of reference video fingerprints 308 stored within the memory, data store or index 304. In the event the fingerprint generated for uploaded video 301 by fingerprint component 320 matches the audio fingerprint and video fingerprint of a reference, that reference can be identified as a potential audio-video match.

Filter component 340 can filter the set of matching videos to generate a filtered set of matching videos. It can be appreciated that matching component 330 may return potential matches that are not filtered by match type, e.g., a video match, an audio match, or an audio-video match. It can be further appreciated that matching component 330 may return potential matches that are false positives and do not contain enough matching content to be deemed a duplicate in certain implementations. Filter component may not remove potential matches, but can instead identify specific relationships between a match and an uploaded video. For example, it can determine the type of match, e.g., audio duplicate, video duplicate, audio-video duplicate. In one implementation, filter component 340 can filter the set of matching videos by comparing the length of the uploaded video 301 and the lengths of the matching videos to determine if they are approximately equal.

In one implementation, filter component 340 can use a diagonal filter that filters the set of matching videos for time consistency. For example, as explained in more detail in regards to FIG. 1, it may be desirable to have duplicate portions of the uploaded video 301 and a potential match reside on a common consistent timeline. In one implementation, filter component 340 can use a coverage filter that filters the set of matching videos based on whether a time of overlap meets a predetermined threshold. The time of overlap is the amount of time that uploaded video 301 and one of the duplicates amongst the set of duplicates returned by matching component 330 overlap. In one implementation, the predetermined threshold can be based off market research or similar data that measures a desired level of filtering with regards to potential duplicate videos. In one implementation the filtered set of matching video can include a set of video duplicates, a set of audio duplicates and a set of audio-video duplicates.

Cluster component 350 can generate a unique cluster-id for the uploaded video wherein the unique cluster-id includes an upload time.

Cluster modification component 360 can modify the unique cluster-id based on a set of cluster-ids associated with the filtered set of matching videos. In one implementation, cluster modification component 360 can modify the unique cluster-id by modifying cluster-ids stored within cluster id and reference sample data store 302. Cluster id and reference sample data store 302 can then be utilized by other components, such as, for example, an index management component as more fully described with respect to FIG. 4 and a search component as more fully described with respect to FIG. 5.

In one implementation cluster modification component 360 can modify the unique cluster-id by replacing the unique cluster-id with a cluster-id associated with a video among the set of matching videos that has the earliest upload time. In one implementation, the cluster modification component 360 can modify the unique cluster-id by replacing the unique cluster-id with a set of cluster-ids wherein the set of cluster-id contains at least one of a video duplicate cluster-id, an audio duplicate cluster-id, or an audio-video duplicate cluster-id. The video duplicate cluster-id can be the cluster-id of a video duplicate amongst the set of video duplicates that has the earliest upload time. The audio duplicate cluster-id can be the cluster-id of an audio duplicate amongst the set of audio duplicates that has the earliest upload time. The audio-video duplicate cluster-id can be the cluster-id of an audio-video duplicate amongst the set of audio-video duplicates that has the earliest upload time. It can be appreciated that in replacing the unique cluster-id, cluster modification component 360 can retain a reference to the upload time of uploaded video 301.

Figure 4:
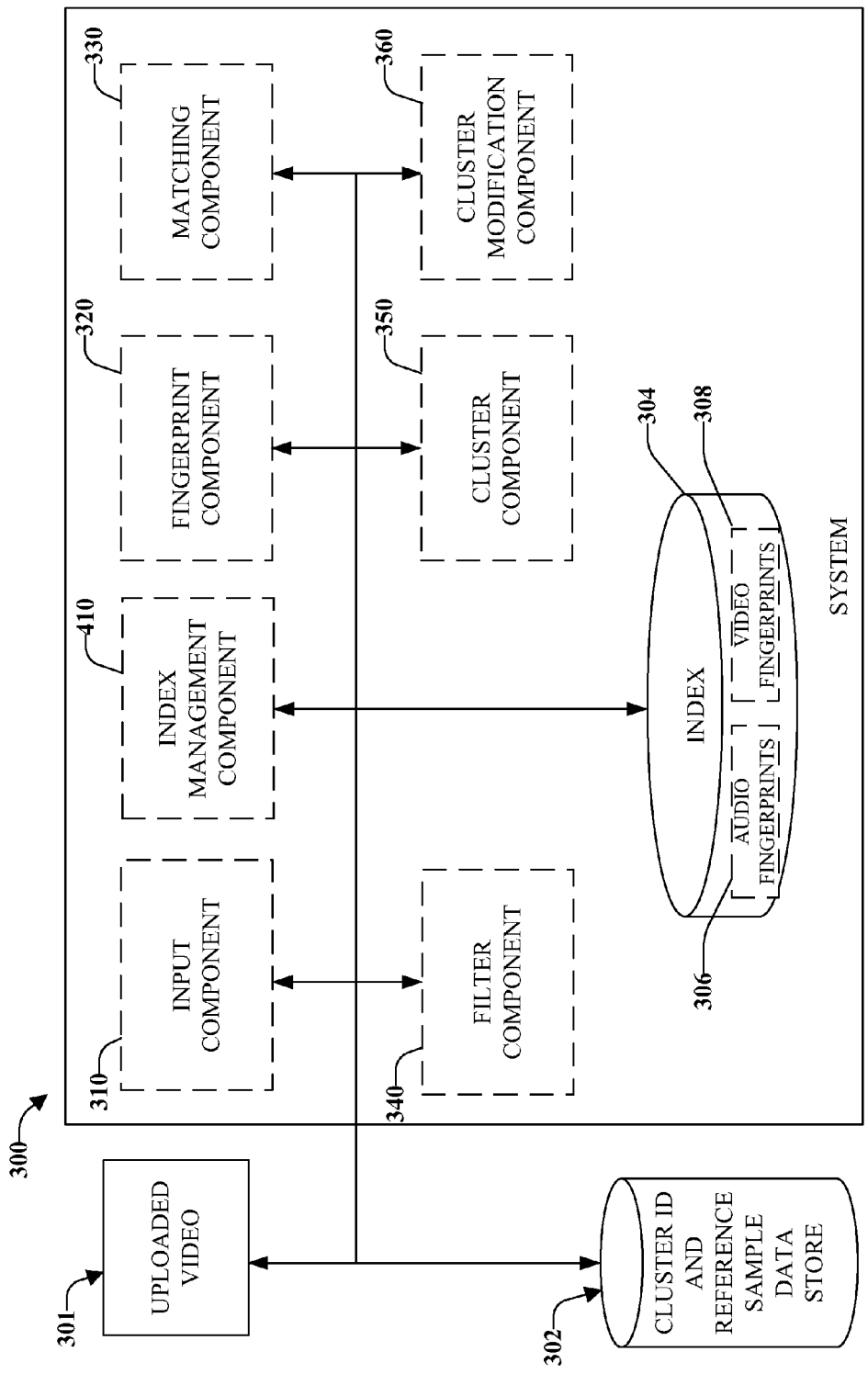
FIG. 4 illustrates a high-level functional block diagram of an example system that detects duplicates of an uploaded video including an index management component in accordance with implementations of this disclosure.

Referring now to FIG. 4, there is illustrated a high-level functional block diagram of an example system that detects duplicates of an uploaded video including an index management component in accordance with implementations of this disclosure. An index management component 410 can modify index 304 by at least one of adding or removing audio fingerprints 306 or video fingerprints 308 from index 304. In one implementation, index management component 410 can add audio fingerprints or video fingerprints to index 304 from cluster id and reference sample data store 302.

In one implementation, index management component 410 can modify index 304 to represent just those fingerprints associated with reference samples relating to a specific period of time. For example, index management component 410 can modify index 304 to contain only fingerprints relating to videos uploaded within the past 24. In another implementation, index management component 410 can modify the index to include both video and audio fingerprints related to all previously uploaded videos. If including audio fingerprints and video fingerprints related to all previously uploaded videos in index 304 would consume too many resources when used by matching component 330 in attempting to match the fingerprint of uploaded video 301, then groups of references can be chosen instead such as recent uploads, most viewed videos over a certain time frame, videos that have been identified by a classifier as likely to have a large number of page views in the near future, previously matched reference samples, etc. It can be appreciated that references and corresponding fingerprints can added based on newly uploaded videos.

In one implementation, index management component 410 can manage index 304 so that audio fingerprints 306 and video fingerprints 308 are stored in a manner optimized for efficient retrieval by certain components, e.g., matching component 330. It can be appreciated that audio fingerprints 306 and video fingerprints 308 can be stored for access by system 300 within a data store disparately located from system 300.

Figure 5:
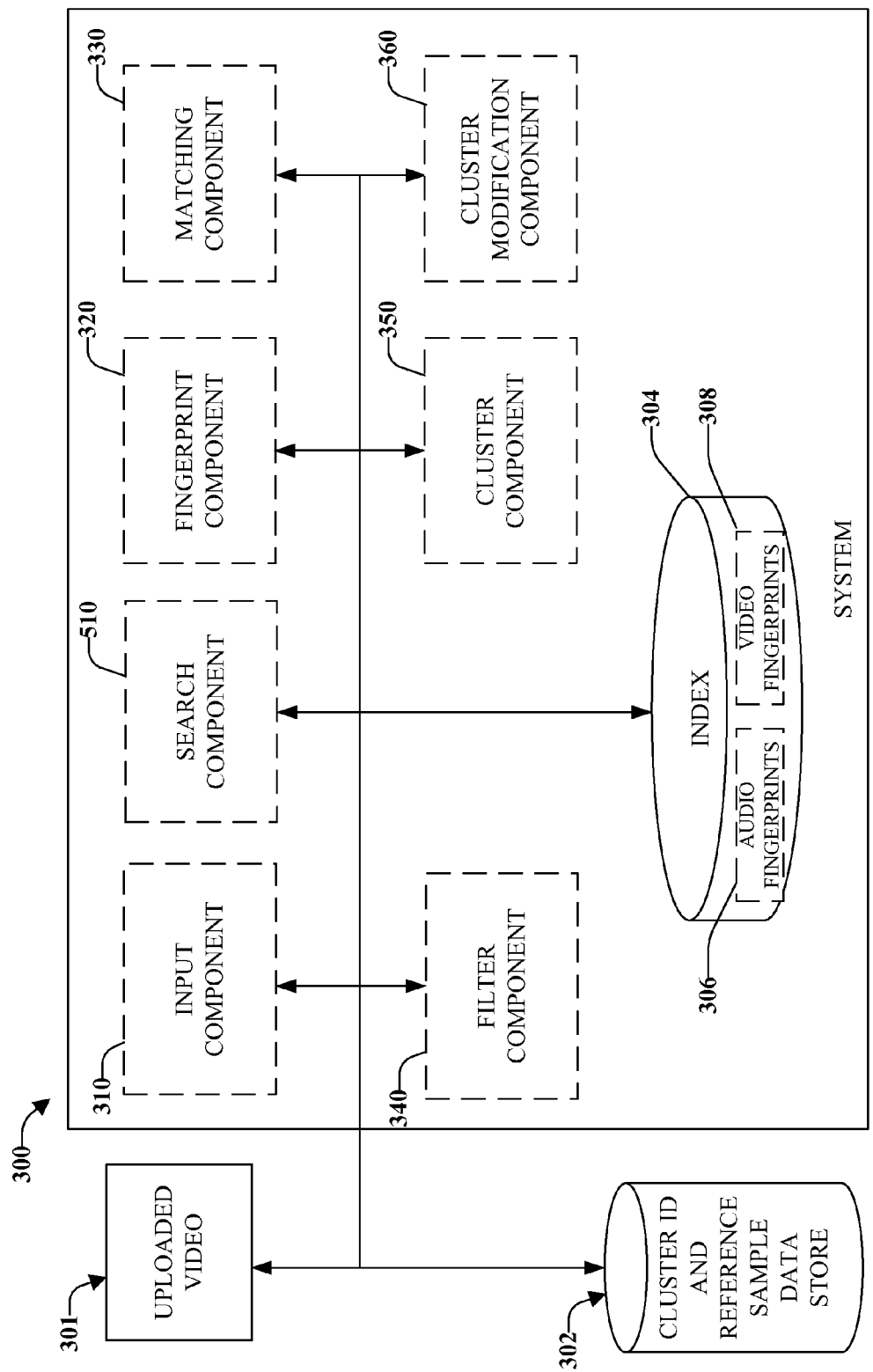
FIG. 5 illustrates a high-level functional block diagram of an example system that detects duplicates of an uploaded video including a search component in accordance with implementations of this disclosure.

Referring now to FIG. 5, there is illustrated a high-level functional block diagram of an example system that detects duplicates of an uploaded video including a search component in accordance with implementations of this disclosure. Search component 510 can generate search results based on search terms wherein the search results are filtered based upon cluster identifiers stored within cluster id and reference sample data store 302. For example, a user of a video sharing service can search for a video they desire to view. Search component 510 can extract cluster ids associated with the initial search results. Search component 510 can then filter the initial search results of the search made by the user based on the extracted cluster-ids.

In one implementation, search component 510 can filter the search results by including a single result for each set of videos containing the same cluster-id. In another implementation, search component 510 can visually group search results based on common cluster-ids.

In one implementation, search component 510 can display search results based on ranking algorithms that incorporate cluster-id associations into the ranking algorithm.

Figure 6:
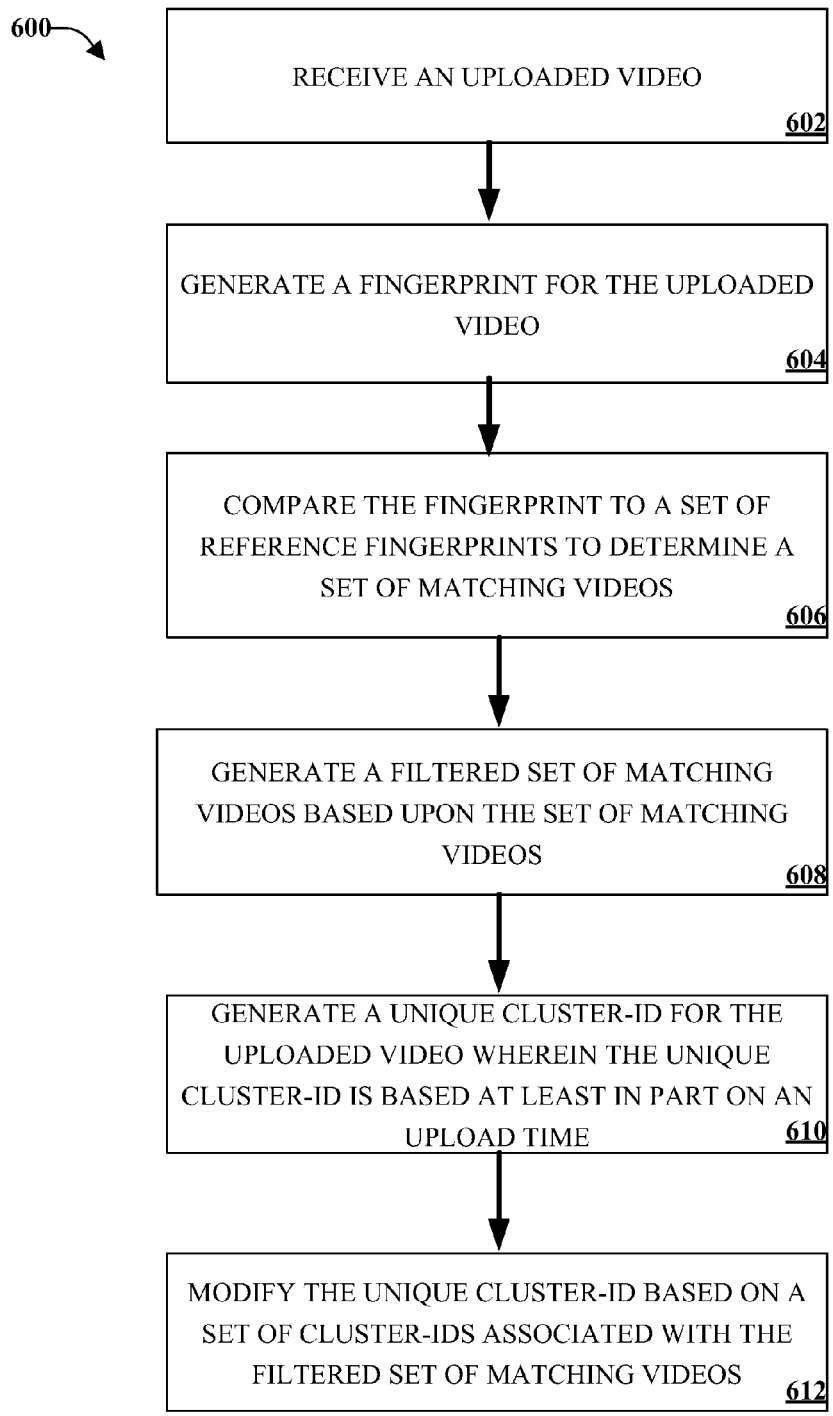
FIG. 6 illustrates an example flow diagram method for detecting duplicates of an uploaded video in accordance with implementations of this disclosure.
Figure 7:
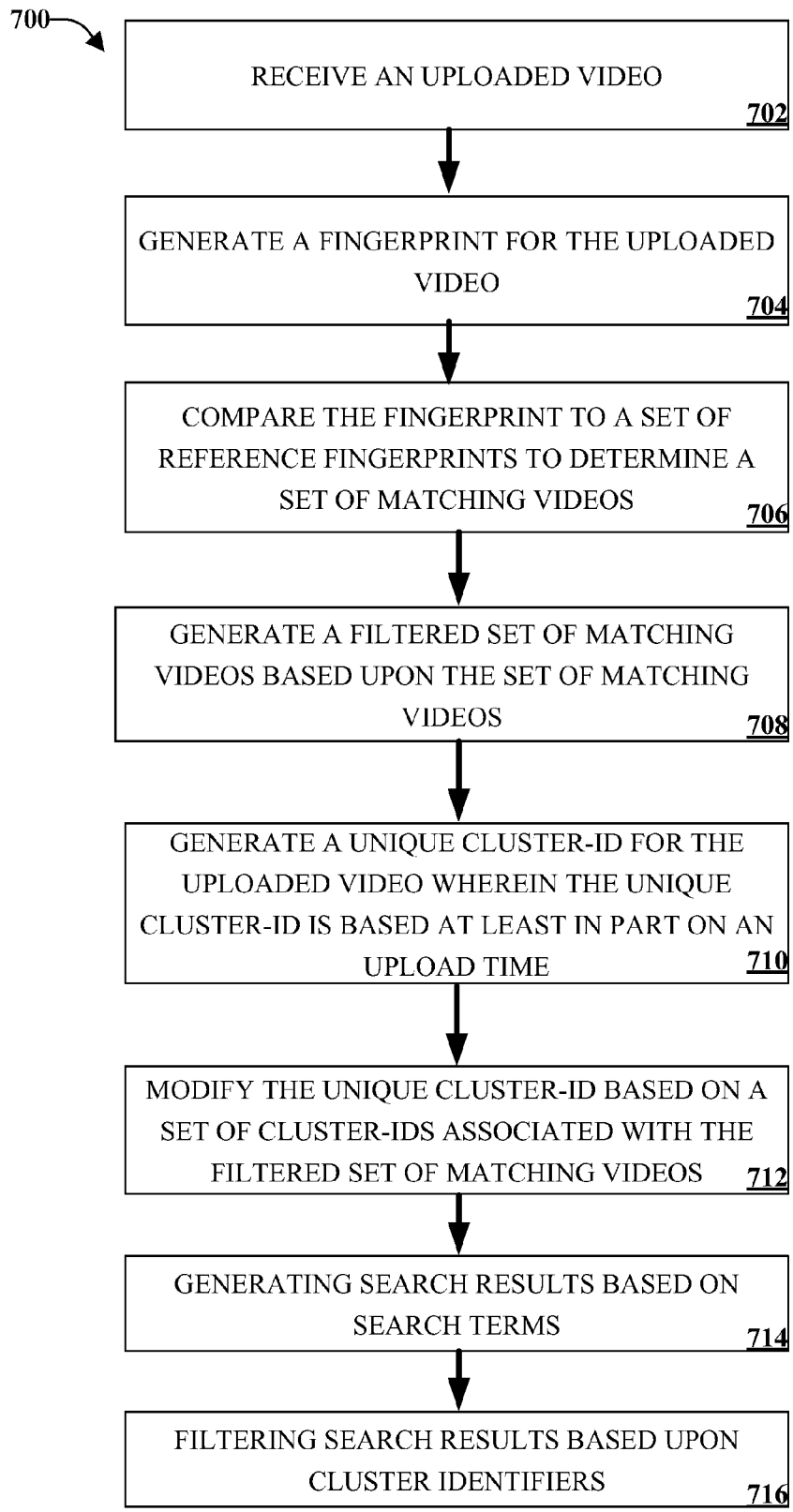
FIG. 7 illustrates an example flow diagram method for detecting duplicates of an uploaded video including generating search results based on duplicate detection in accordance with implementations of this disclosure.
Figure 8:
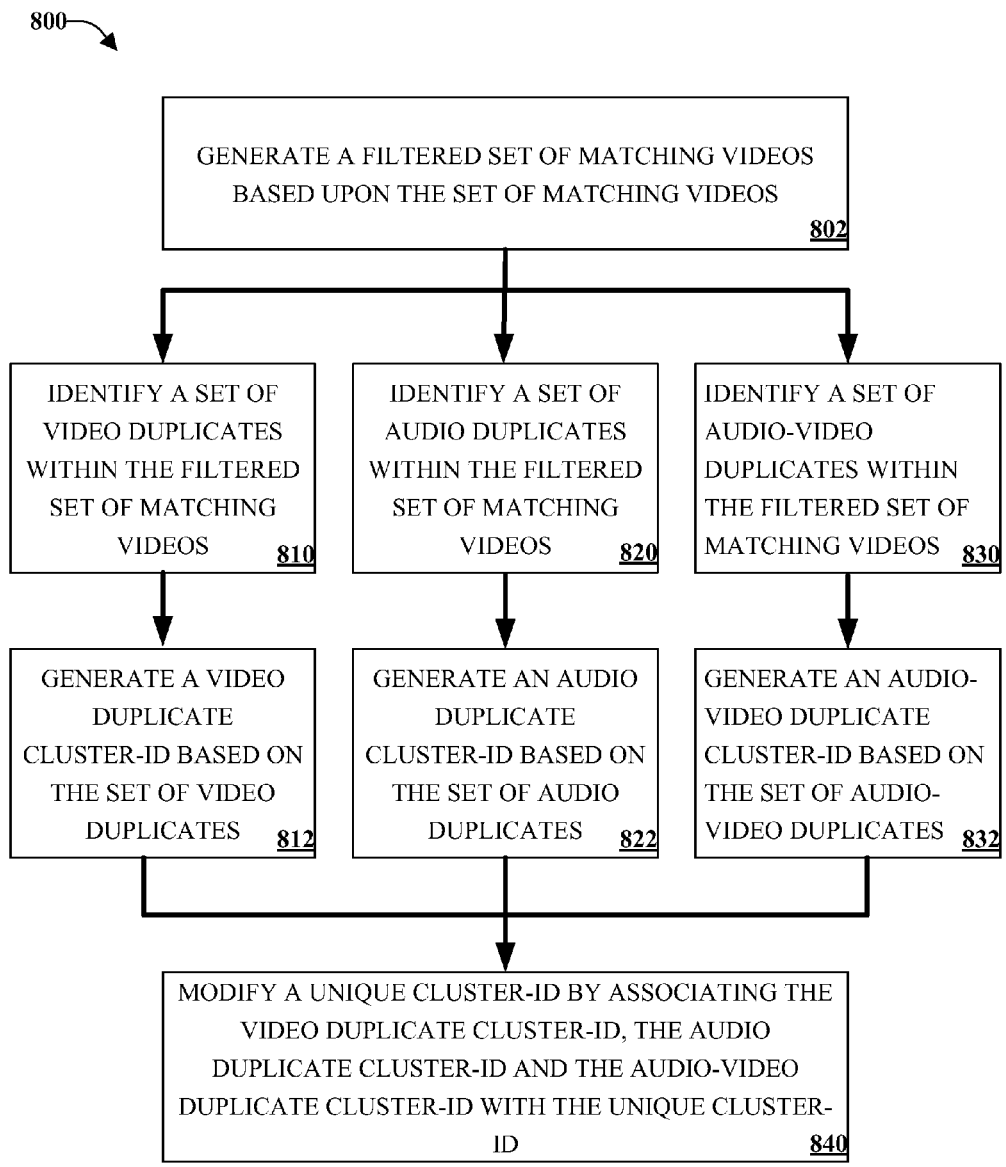
FIG. 8 illustrates an example flow diagram method for filtering duplicates and modifying a unique cluster-id based on the filtering in accordance with implementations of this disclosure.

FIGS. 6-8 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methods.

Referring now to FIG. 6 there is illustrated an example flow diagram method for detecting duplicates of an uploaded video in accordance with implementations of this disclosure. At 602, an uploaded video can be received (e.g., by an input component). At 604, a fingerprint for the uploaded can be generated (e.g., by a fingerprint component). At 606, the fingerprint can be compared (e.g., by a matching component) to a set of reference fingerprints to determine a set of matching videos. At 608, a filtered set of matching video can be generated (e.g., by a filter component) based upon the set of matching videos. At 610, a unique cluster-id for the uploaded video can be generated (e.g., by a cluster component). The unique cluster-id can include or be based upon, for example, an upload time. At 612, the unique cluster-id can be modified (e.g., by a cluster modification component).

Referring now to FIG. 7 there is illustrated an example flow diagram method for detecting duplicates of an uploaded video including generating search results based on duplicate detection in accordance with implementations of this disclosure. At 702, an uploaded video can be received (e.g., by an input component). At 704, a fingerprint for the uploaded can be generated (e.g., by a fingerprint component). At 706, the fingerprint can be compared (e.g., by a matching component) to a set of reference fingerprints to determine a set of matching videos. At 708, a filtered set of matching video can be generated (e.g., by a filter component) based upon the set of matching videos. At 710, a unique cluster-id for the uploaded video can be generated (e.g., by a cluster component). Again, the unique cluster-id can include or be based upon an upload time. At 712, the unique cluster-id can be modified (e.g., by a cluster modification component).

At 714, search results can be generated (e.g., by a search component) based on search terms. At 716, search results can be filtered (e.g., by a search component) based on cluster-ids.

Referring now to FIG. 8 there is illustrated an example flow diagram method for filtering duplicates and modifying a unique cluster-id based on the filtering in accordance with implementations of this disclosure. At 802 a filtered set of matching video can be generated (e.g., by a filter component) based upon the set of matching videos. At 810, a set of video duplicates can be identified (e.g., by a filter component) within the filtered set of matching videos. At 812, a video duplicate cluster-id can be generated or identified (e.g., by a cluster modification component) based on the set of video duplicates.

At 820, a set of audio duplicates can be identified (e.g., by a filter component) within the filtered set of matching videos. At 822, an audio duplicate cluster-id can be generated or identified (e.g., by a cluster modification component) based on the set of video duplicates.

At 830, a set of audio-video duplicates can be identified (e.g., by a filter component) within the filtered set of matching videos. At 832, an audio-video duplicate cluster-id can be generated or identified (e.g., by a cluster modification component) based on the set of video duplicates.

At 840, a unique cluster-id can be modified (e.g, by a cluster modification component). For example, the unique cluster-id can be modified by associating the video duplicate cluster-id, the audio duplicate cluster-id, and the audio-video cluster-id with the unique cluster-id. It can be appreciated that the unique cluster-id can retain a reference to the upload time of the video for which the unique cluster-id was generated.

As used herein, "video" may refer to visual content alone, or both audio and visual content, as will be understood based on context. Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 9:
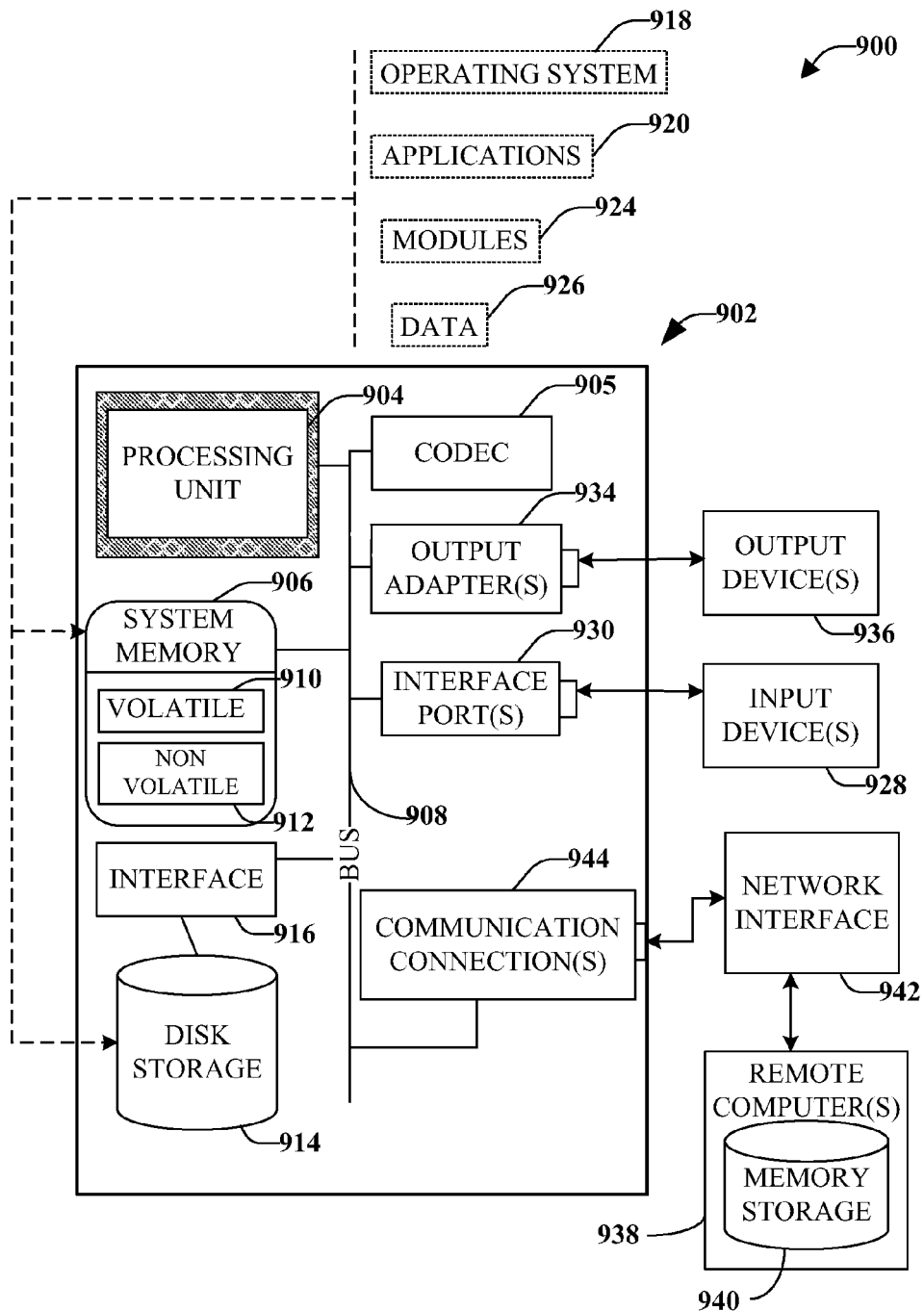
FIG. 9 illustrates an example block diagram of a computer operable to execute the disclosed architecture in accordance with implementations of this disclosure.

With reference to FIG. 9, a suitable environment 900 for implementing various aspects of the claimed subject matter includes a computer 902. The computer 902 includes a processing unit 904, a system memory 906, a codec 905, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 902 may also include removable/non-removable, volatile/non-volatile computer storage media. FIG. 9 illustrates, for example, a disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
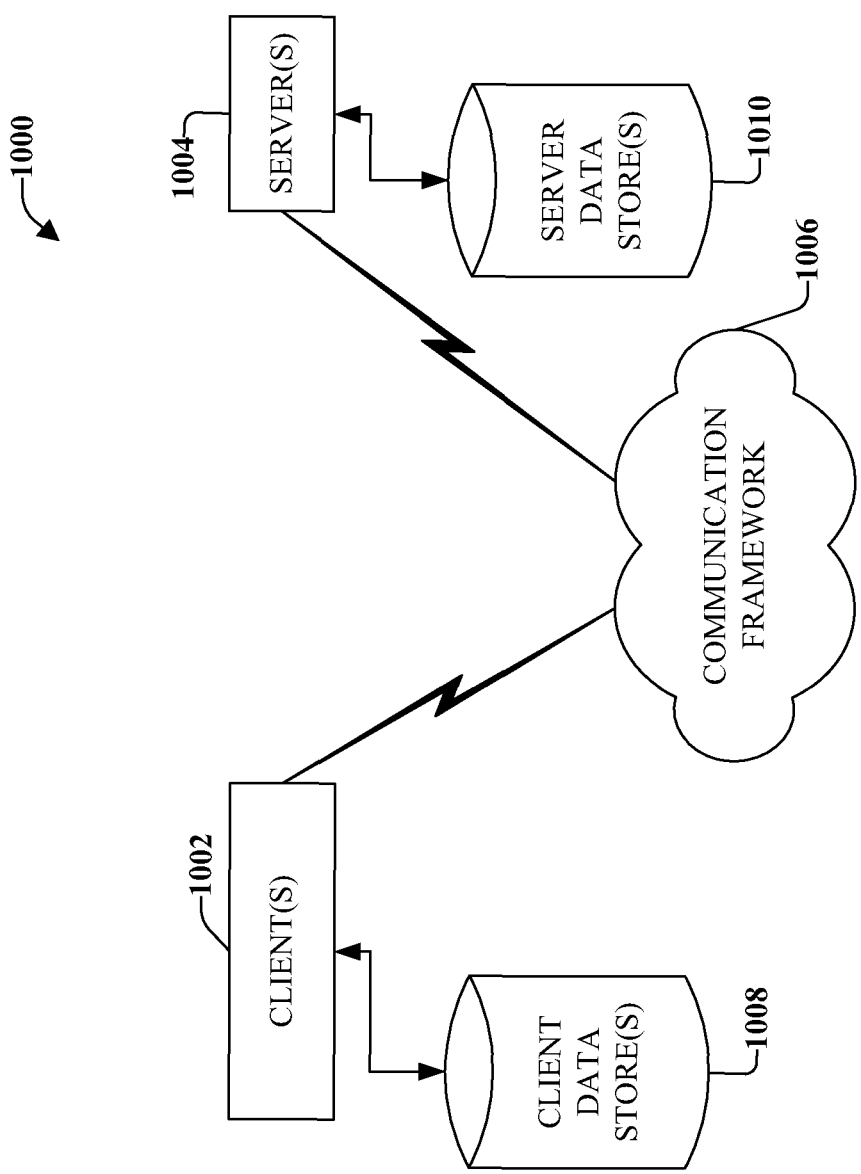
FIG. 10 illustrates an example schematic block diagram for a computing environment in accordance with implementations of this disclosure.

Referring now to FIG. 10, there is illustrated a schematic block diagram of a computing environment 1000 in accordance with the subject specification. The system 1000 includes one or more client(s) 1002, which can include an application or a system that accesses a service on the server 1004. The client(s) 1002 can be hardware and/or software (e.g., threads, processes, computing devices). The client(s) 1002 can house cookie(s), metadata, and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform, for example, receiving an uploaded video, generating a fingerprint, matching a fingerprint, filtering a set of potential matches, generating cluster-ids, modifying cluster-ids, etc. in accordance with the subject disclosure. One possible communication between a client 1002 and a server 1004 can be in the form of a data packet adapted to be transmitted between two or more computer processes where the data packet contains, for example, portions of a video stream. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
  a memory that has stored thereon computer executable components; and
  a processor that executes the following computer executable components stored in the memory:
    an input component that receives an uploaded video;
    a fingerprint component that generates a fingerprint for the uploaded video;
    a matching component that compares the fingerprint to a set of reference fingerprints associated with reference videos to determine a set of matching reference videos;
    a cluster component that generates a unique cluster identifier for the uploaded video wherein the unique cluster identifier is based at least in part on an upload time; and
    a cluster modification component that replaces the unique cluster identifier according to the following:
      disassociate the unique cluster identifier from the uploaded video;
      in response to one or more first matching reference video of the set of matching reference videos only being an audio match to the uploaded video, associate an audio cluster identifier with the uploaded video comprising a first cluster identifier of a first matching reference video that is the audio match to the uploaded video with an earliest upload time of the one or more first matching reference video;
      in response to one or more second matching reference video of the set of matching reference videos only being a video match to the uploaded video, associate a video cluster identifier with the uploaded video comprising a second cluster identifier of a second matching reference video that is the video match to the uploaded video with an earliest upload time of the one or more second matching reference video; and
      in response to one or more third matching reference video of the set of matching reference videos being the audio match and the video match to the uploaded video, associate an audio-video cluster identifier with the uploaded video comprising a third cluster identifier of a third matching reference video that is the audio match and the video match to the uploaded video with an earliest upload time of the one or more third matching reference video.

2. The system of claim 1, wherein the cluster modification component associates the upload time with the uploaded video.

3. The system of claim 1, wherein the set of matching reference videos comprises at least one of a first matching reference video that is only the audio match to the uploaded video, a second reference matching video that is only the video match to the uploaded video; or a third reference matching video that is the audio match and the video match to the uploaded video.

4. The system of claim 1, wherein the the fingerprint component generates the fingerprint in real-time during the upload of the video.

5. The system of claim 1, further comprising:
  a search component that generates and presents search results based on search terms, wherein the search results are filtered based upon at least one of audio cluster identifiers, video cluster identifiers, or audio-video cluster identifiers.

6. The system of claim 5, wherein the search component filters the search results by including a single video in the search results for each set of videos containing the same audio cluster identifier, video cluster identifier, or audio-video cluster identifier.

7. The system of claim 5, wherein the search component visually groups search results based on common audio cluster identifiers, video cluster identifiers, or audio-video cluster identifiers.

8. The system of claim 1, further comprising a filter component uses a diagonal filter that filters the set of matching reference videos based on consistency of timeline with the uploaded video.

9. The system of claim 1, further comprising a filter component uses a coverage filter that filters the set of matching reference videos based on whether an amount of time of overlap between the uploaded video and a matching reference video meets a predetermined threshold.

10. The system of claim 1, further comprising:
  an index management component that at least one of adds or removes a reference fingerprint from the set of reference fingerprints based on at least one of an upload time of a reference video associated with reference fingerprint, a current popularity of the reference video associated with reference fingerprint, a predicted popularity of the reference video associated with reference fingerprint, or a previous match of the reference video associated with reference fingerprint.

11. A method, comprising:
  receiving, by a system including a processor, an uploaded video;
  generating, by the system, a fingerprint for the uploaded video;
  comparing, by the system, the fingerprint to a set of reference fingerprints associated with reference videos to determine a set of matching reference videos;
  generating, by the system, a unique cluster identifier for the uploaded video wherein the unique cluster identifier is based at least in part on an upload time; and
  modifying, by the system, the unique cluster-id according to the following:
    removing the unique cluster identifier from the uploaded video;
    in response to one or more first matching reference video of the set of matching reference videos only being an audio match to the uploaded video, adding an audio cluster identifier to the uploaded video comprising a first cluster-id of a first matching reference video that is the audio match to the uploaded video with an earliest upload time of the one or more first matching reference video;

in response to one or more second matching reference video of the set of matching reference videos only being a video match to the uploaded video, adding a video cluster identifier to the uploaded video comprising a second cluster identifier of a second matching reference video that is the video match to the uploaded video with an earliest upload time of the one or more second matching reference video; and in response to one or more third matching reference video of the set of matching reference videos being the audio match and the video match to the uploaded video, adding an audio-video cluster identifier to the uploaded video comprising a third cluster identifier of a third matching reference video that is the audio match and the video match to the uploaded video with an earliest upload time of the one or more third matching reference video.

12. The method of claim 11, further comprising adding, by the system, the upload time to the uploaded video.

13. The method of claim 11, wherein the filtered set of matching videos comprises a first matching reference video that is only the audio match to the uploaded video, a second reference matching video that is only the video match to the uploaded video; or a third reference matching video that is the audio match and the video match to the uploaded video.

14. The method of claim 13, wherein the generating the fingerprint occurs in real-time during the upload of the video.

15. The method of claim 11, further comprising:
generating, by the system, search results based on search terms; and
filtering, by the system, the search results based upon at least one of an audio cluster identifiers, video cluster identifiers, or audio-video cluster identifiers.

16. The method of claim 15, wherein filtering the search results comprises including a single video in the search results for each set of videos containing an identical audio cluster identifier, video cluster identifier, or audio-video cluster identifier.

17. The method of claim 15, wherein the filtering the search results comprises visually grouping search results based on common audio cluster identifiers, video cluster identifiers, or audio-video cluster identifiers.

18. The method of claim 11, further comprising filtering, by the system, the set of matching reference videos based on consistency of timeline with the uploaded video.

19. The method of claim 11, filtering, by the system, the set of matching reference videos based on whether an amount of time of overlap between the uploaded video and a matching reference video meets a predetermined threshold.

20. A non-transitory computer-readable medium having instructions stored thereon that, in response to execution, cause a system including a processor to perform operations comprising:
receiving an uploaded media;
generating a fingerprint for the uploaded media;
comparing the fingerprint to a set of reference fingerprints associated with reference media to determine a set of matching reference media;
generating a unique cluster identifier for the uploaded media wherein the unique cluster identifier is based at least in part on an upload time; and
replacing the unique cluster identifier according to the following:
unlinking the unique cluster identifier from the uploaded video;
in response to one or more first matching reference video of the set of matching reference videos only being an audio match to the uploaded video, linking an audio cluster identifier to the uploaded video comprising a first cluster-id of a first matching reference video that is the audio match to the uploaded video with an earliest upload time of the one or more first matching reference video;
in response to one or more second matching reference video of the set of matching reference videos only being a video match to the uploaded video, linking a video cluster identifier to the uploaded video comprising a second cluster identifier of a second matching reference video that is the video match to the uploaded video with an earliest upload time of the one or more second matching reference video; and
in response to one or more third matching reference video of the set of matching reference videos being the audio match and the video match to the uploaded video, linking an audio-video cluster identifier to the uploaded video comprising a third cluster identifier of a third matching reference video that is the audio match and the video match to the uploaded video with an earliest upload time of the one or more third matching reference video.

21. The non-transitory computer-readable medium of claim 20, further comprising:
generating search results based on search terms; and
filtering the search results based upon at least one of audio cluster identifiers, video cluster identifiers, or audio-video cluster identifiers.

22. The non-transitory computer-readable medium of claim 21, wherein the filtering the search results comprises including a single video in the search results for each set of videos containing an identical audio cluster identifier, video cluster identifier, or audio-video cluster identifier.

23. The non-transitory computer-readable medium of claim 21, wherein filtering the search results comprises visually grouping search results based on common audio cluster identifiers, video cluster identifiers, or audio-video cluster identifiers.

* * * * *